Patented June 27, 1933

1,915,430

UNITED STATES PATENT OFFICE

LEOPOLD LASKA AND ARTHUR ZITSCHER, OF OFFENBACH-ON-THE-MAIN, GERMANY, ASSIGNORS TO GENERAL ANILINE WORKS, INC., OF NEW YORK, N. Y., A CORPORATION OF DELAWARE

AZO DYESTUFFS INSOLUBLE IN WATER AND FIBER DYED THEREWITH

No Drawing. Application filed August 26, 1931, Serial No. 559,593, and in Germany August 29, 1930.

Our present invention relates to new azo dyestuffs insoluble in water and to fiber dyed therewith.

These dyestuffs correspond to the general formula:

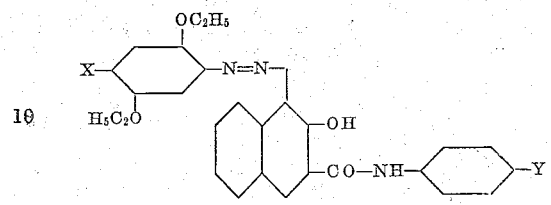

wherein X means chlorine or bromine and Y means a methyl, ethyl, methoxy or ethoxy group.

They are obtained by combining the diazo compound of 1-amino-4-halogen-2.5-diethoxy-benzene with 1-(2-hydroxy-naphthalene-3-carbonyl)amino-4-alkyl-(or 4-alkoxy)-benzene.

They may be produced in substance and used for making color lakes or they may be prepared on fibers. As fibers suitable for the production of these dyestuffs thereon may be named: animal fibers (for example, silk) native cellulose (for example, cotton), regenerated cellulose (for example, viscose).

The dyeings thus obtained show reddish to bluish violet shades and are distinguished by a good fastness, especially to peroxide-bleaching. The latter operation consists in treating at a temperature rising from 40° C. to about 80° C. for ¾ of an hour 1 part of dyed material with 10 parts of a solution containing per liter 2 grs. of sodium peroxide and 6 grs. of water-glass.

By the present invention the possibility of producing violet dyeings by means of the ice color method is enlarged since among the diazo compounds of the benzene series only those containing a further nitrogenous group were hitherto known to turn the shades sufficiently to the blue end of the spectrum.

In order to further illustrate our invention, the following examples are given. We wish it, however, to be understood that we are not limited to the particular products or reaction conditions mentioned therein.

Example 1

Well boiled and dried cotton yarn is impregnated with a solution containing per liter 5.5 grs. of 1-(2-hydroxy-naphthalene-3-carbonyl)-amino-4-methoxy-benzene, 16.5 cc. of caustic soda solution of 34° Bé. and 10 cc. of Turkey red oil. The goods are wrung out and developed with a solution which contains per liter the diazo compound of 2.15 grs. of 1-amino-4-chloro-2.5-diethoxy-benzene and is neutralized with sodium bicarbonate. Then they are rinsed and soaped.

In this manner a dark bluish violet dyeing of a very good fastness to peroxide is obtained. The dyestuff thus produced on the fiber corresponds to the formula:

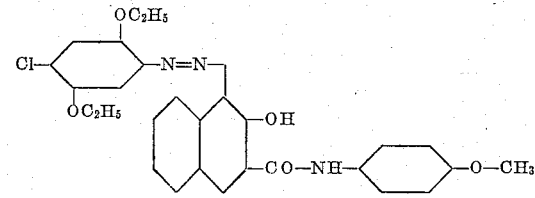

By impregnating the yarn with 1-(2-hydroxy-naphthalene-3-carbonyl)-amino-4-ethoxy-benzene a reddish violet, with 1-(2-hydroxy-naphthalene-3-carbonyl)-amino-4-ethyl-benzene also a reddish violet dyeing is obtained.

Example 2

Cotton yarn, previously treated in an appropriate manner, is impregnated with a solution containing per liter 6 grs. of 1-(2-hydroxy-naphthalene-3-carbonyl)-amino-4-methyl-benzene, 12 cc. of caustic soda solution of 34° Bé. and 10 cc. of Turkey red oil. The goods are well dehydrated and developed with a solution which contains per liter the diazo compound of 2.6 grs. of 1-amino-4-bromo-2.5-diethoxy-benzene and is neutralized with sodium bicarbonate. After finishing in the usual manner a dark violet dyeing of a very good fastness to chlorine and to peroxide is obtained. The dyestuff thus produced on the fiber corresponds to the formula:

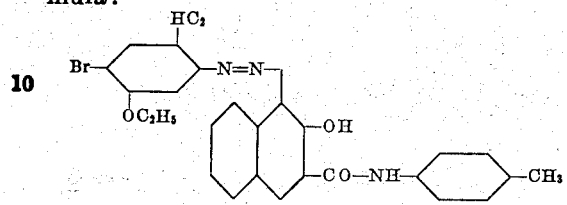

By means of the same diazo compound, 1-(2-hydroxy-naphthalene-3-carbonyl)-amino-4-ethyl-benzene yields a bluish violet, 1-(2-hydroxy-naphthalene-3-carbonyl)-amino-4-ethoxy-benzene a reddish violet dyeing.

*Example 3*

A hank of silk is impregnated in a solution which contains per liter 2.5 grs. of 1-(2-hydroxy-naphthalene-3-carbonyl)-amino-4-methoxy-benzene, 3.75 cc. of caustic soda solution of 34° Bé., 2.5 cc. of Turkey red oil and one of the customary silk-protecting agents, as, for example, sulfite-cellulose waste liquor, the temperature being maintained at about 25° C. After 15 minutes 10 grs. of common salt are added and the hank is again handled for ¼ of an hour and then well dehydrated.

Thereafter it is developed in a bath which contains per liter the diazo compound of 2.6 grs. of 1-amino-4-bromo-2.5-diethoxy-benzene, 5 cc. of an acetic acid of 50 per cent strength and 10 grs. of common salt and which is neutralized with sodium acetate. After soaping, rinsing and drying a reddish violet dyeing is obtained. The dyestuff thus produced on the fiber corresponds to the formula:

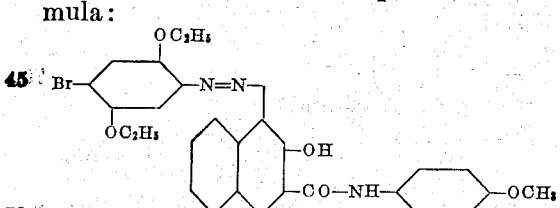

*Example 4*

Viscose is impregnated for half an hour in a bath containing per liter 3 grs. of 1-(2-hydroxy-naphthalene-3-carbonyl)-amino-4-methyl-benzene, 4.5 cc. of caustic soda solution of 34° Bé. and 3 cc. of Turkey red oil. Thereto 10 grs. of common salt are gradually added. Thereafter the goods are well centrifuged and developed in a solution which contains per liter the diazo compound of 2.15 grs. of 1-amino-4-chloro-2.5-diethoxy-benzene, the excess of mineral acid having been neutralized with sodium acetate. After rinsing and soaping a reddish violet dyeing is obtained. The dyestuff thus produced on the fiber corresponds to the formula:

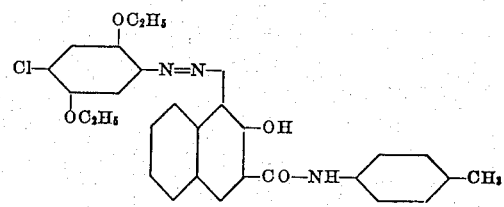

We claim:
1. As new compounds the azo dyestuffs corresponding to the general formula:

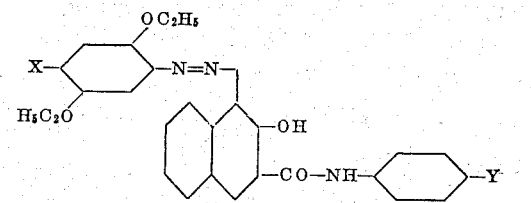

wherein X means chlorine or bromine and Y means a methyl, ethyl, methoxy or ethoxy group, which compounds are insoluble in water and yield when produced on fibers reddish to bluish violet dyeings of a good fastness.

2. As a new compound the azo dyestuff corresponding to the formula:

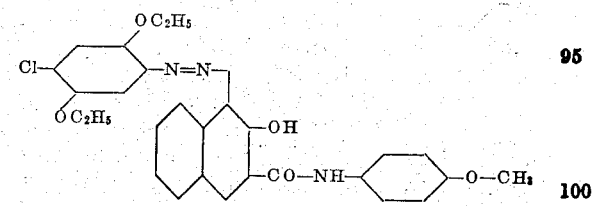

which compound is insoluble in water and yields when produced on fibers dark bluish violet dyeings of a good fastness.

3. As a new compound the azo dyestuff corresponding to the formula:

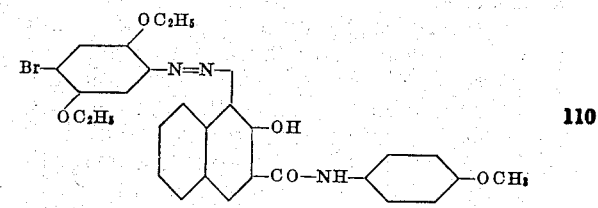

which compound is insoluble in water and yields when produced on fibers dark bluish violet dyeings of a good fastness.

4. Fiber dyed with the azo-dyestuffs as claimed in claim 1.

5. Fiber dyed with the azo-dyestuff as claimed in claim 2.

6. Fiber dyed with the azo-dyestuff as claimed in claim 3.

In testimony whereof, we affix our signatures.

LEOPOLD LASKA.
ARTHUR ZITSCHER.